G. SCHLATTER.
LOCKING DEVICE FOR SPEED CHANGING GEARS.
APPLICATION FILED DEC. 24, 1912.
1,175,563.
Patented Mar. 14, 1916.
2 SHEETS—SHEET 1.
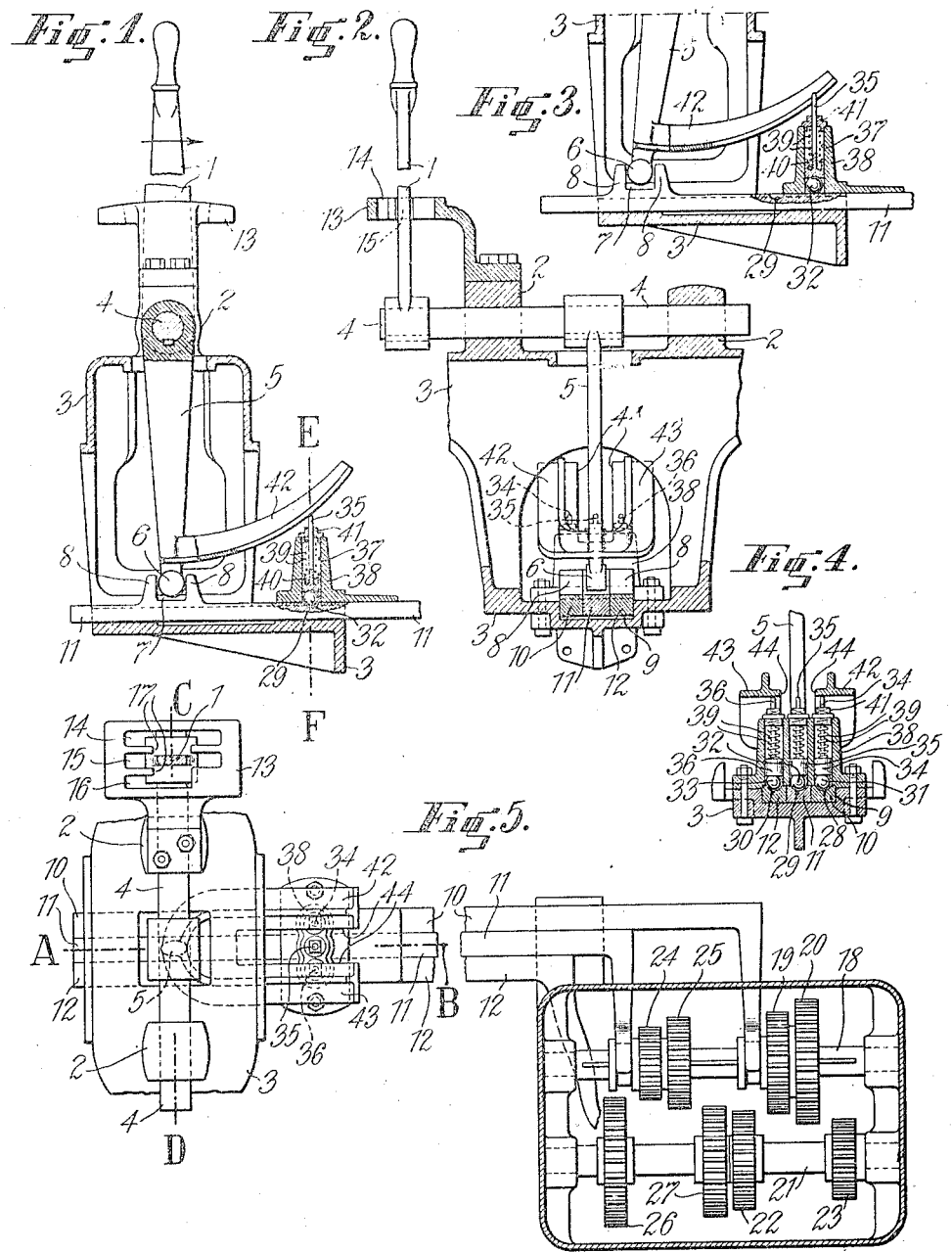
Witnesses:
Charles Mathé
W. J. Browne
Inventor
Gustav Schlatter
by
John Lotka
Attorney

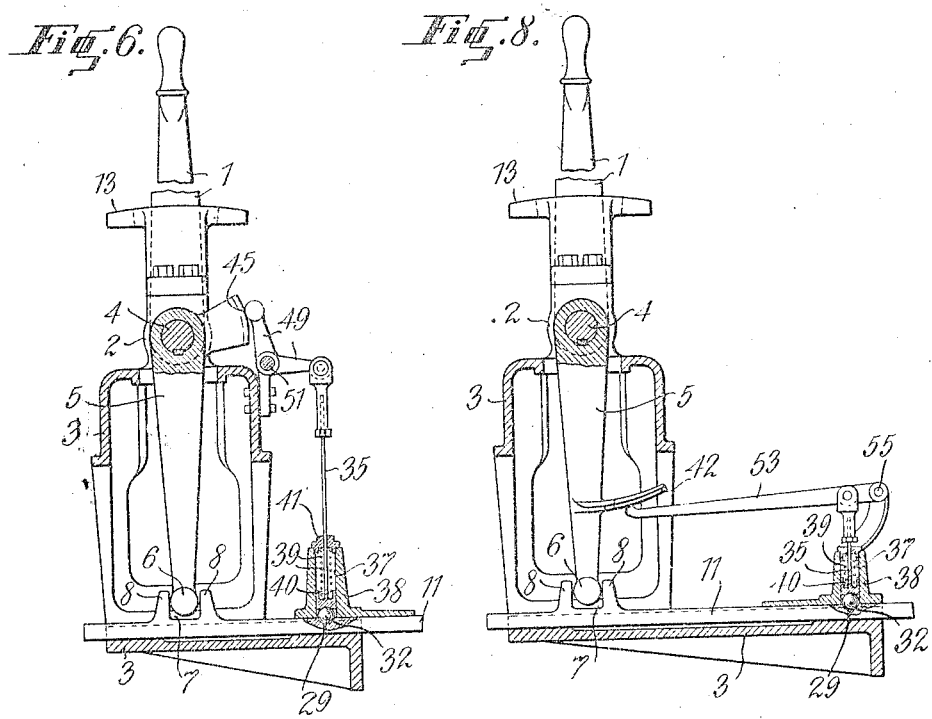
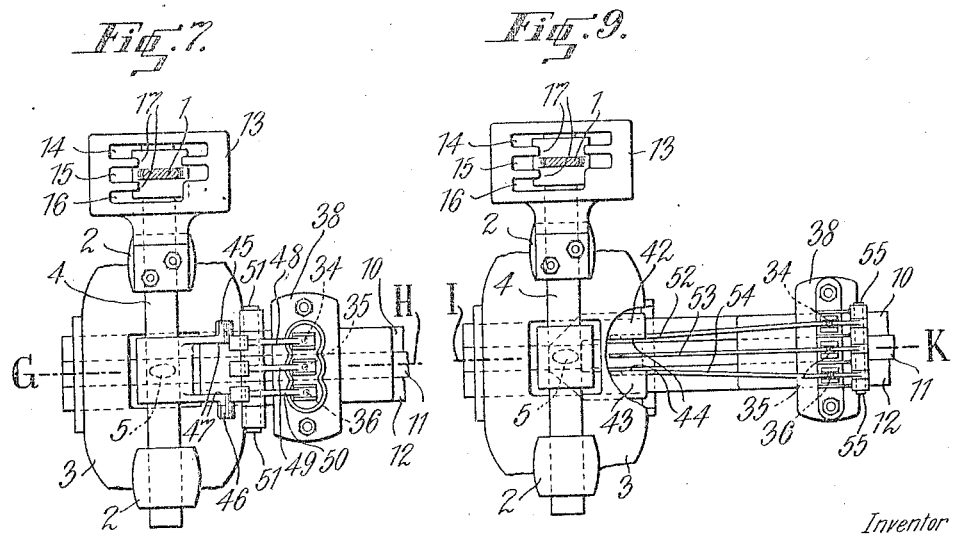

UNITED STATES PATENT OFFICE.

GUSTAV SCHLATTER, OF BERGLI, ARBON, SWITZERLAND, ASSIGNOR TO THE FIRM OF ADOLPH SAURER, OF ARBON, SWITZERLAND.

LOCKING DEVICE FOR SPEED-CHANGING GEARS.

1,175,563.
Specification of Letters Patent.
Patented Mar. 14, 1916.

Application filed December 24, 1912. Serial No. 738,433.

*To all whom it may concern:*

Be it known that I, GUSTAV SCHLATTER, a citizen of the Swiss Confederation, and resident of Bergli, Arbon, Switzerland, have invented certain new and useful Improvements in Locking Devices for Speed-Changing Gears, of which the following is a specification.

My invention relates to speed-changing gears, such as are used for instance in selective transmissions of the sliding gear type customary in automobiles, and has for its object to provide a simple and efficient locking device for speed-changing gears of this general character.

Selective transmissions of the type indicated above are ordinarily operated by means of a controlling lever capable of swinging about a fulcrum and also movable lengthwise of the axis of said fulcrum, this lever acting on rods which shift the gears into and out of mesh and also effecting a temporary locking of those rods which correspond to the gears temporarily out of mesh. In my present invention, I employ locking members, preferably of curved shape, which are movable in unison with the controlling lever. These locking members serve to place holding members or stops in engagement with those gear-shifting rods which at the time are not in operative relation to the controlling lever. Whenever a gear-shifting rod is brought into operative relation to the controlling lever, the holding member or stop coöperating with that particular rod is inactive or released, so that said rod may be shifted by the controlling lever.

In locking devices for transmissions of the type indicated above, constructions have been devised in which the controlling lever is connected with a locking bar or bolt movable transversely of the gear-shifting rods in grooves of said rods. This locking bar is made with a cross groove in which the shifting rod temporarily connected with the controlling lever may slide, the other shifting rods being locked by the said bar or bolt entering their grooves. My new locking device is superior to the one just indicated in that it is much less subject to wear, and therefore more durable. This improved result is due to the fact that according to my invention the several gear-shifting rods coöperate, not with a single cross bar common to all of them and moved by the controlling lever, but with individual holding members or stops.

Three examples of my invention are illustrated by the accompanying drawings, in which—

Figure 1 is a vertical section through a portion of the improved speed-changing gear, taken on line A—B of Fig. 5; Fig. 2 is a horizontal section on line C—D of Fig. 5; Fig. 3 is a vertical section of some parts, taken in the same plane as Fig. 1, but with the movable parts in a different position; Fig. 4 is a vertical section on line E—F of Fig. 1; Fig. 5 is a top view, with parts in section, of a speed-changing gear such as illustrated in Figs. 1 to 4; Fig. 6 is a vertical section, on line G—H of Fig. 7, showing another form of my invention; Fig. 7 is a top view of the construction shown in Fig. 6; Fig. 8 is a vertical section, on line I—K of Fig. 9, showing a third form of construction; and Fig. 9 is a corresponding top view.

The mechanism shown in Figs. 1 to 5 comprises a manually operated controlling lever 1 which is secured rigidly to a shaft 4 mounted to rock and also to slide axially in bearings 2 carried by the frame 3. Between the bearings 2, the shaft 4 carries a downwardly-projecting coupling arm 5 provided with a rounded head 6 which is adapted to enter the coupling recess 7 in the upwardly-extending lug 8 of one or the other of the (three) gear-shifting rods 10, 11, 12. These rods are mounted to slide lengthwise individually in a suitable guide 9 secured to the frame 3 and ranging transversely of the shaft 4. Axial shifting of the shaft 4 and controlling lever 1 will bring the coupling arm 5 into operative relation with one or the other of the gear-shifting rods 10, 11, 12. The lever 1 is movable in a guide 13 of well-known formation carried by one of the bearings 2. This arc-shaped guide has three longitudinal slots 14, 15, 16 corresponding to the positions taken by the lever when its arm 5 engages the rods 10, 11 and 12 respectively. The slots 14, 15, 16 are connected by longitudinal slots or openings 17 arranged centrally so that the lever 1 can be brought from one of the slots 14, 15, 16 to the others only when said lever is in the central or neutral position.

The shifting rod 10 is connected in the well-known manner with the gears 19, 20 mounted by means of groove and feather on the drive shaft 18, so that the gears may slide lengthwise of said shaft while compelled to rotate with it constantly. As the rod 10 is shifted in one direction or the other, the gear 19 or 20 will be brought into mesh with the gear 22 or 23 respectively securedly rigidly to the countershaft 21. Similarly, shifting the rod 11, will bring the gear 24 into mesh with the countershaft gear 26, or the gear 25 into mesh with the countershaft gear 27, the gears 24, 25 being slidable in unison on the key or feather of the drive shaft 18, and rotating with said shaft. The shifting rod 12 operates in a well-known manner an auxiliary gear (not shown); according as this auxiliary gear is thrown into or out of mesh by the shifting rod 12, the countershaft 21 will rotate in one direction or the other. The rod 12 therefore is shifted to effect the reversal of the transmission.

As shown in Fig. 4, each of the shifting rods 10, 11, 12 is provided with a spherically rounded socket 28, 29 and 30 respectively. When the rods are in their normal or neutral position, these sockets receive holding members or stops formed by balls 31, 32, and 33 respectively pressed downward by plungers or holding rods 34, 35, and 36 respectively movable vertically in cylindrical chambers 37 of a guide 38 secured to the frame 3. The rods 34, 35, 36 are pressed downward by springs 39, the lower end of each spring fitting into an annular groove 40 provided in an enlarged portion near the lower end of the corresponding rod or plunger, while the upper end of the spring bears against a plug 41 screwed into the upper end of the corresponding chamber 37 and perforated to guide the upper end of the rod 34, 35, or 36 respectively, which projects upwardly beyond said plug.

According to my invention, the coupling arm 5 secured to the controller shaft 4 is provided with two arc-shaped or segmental locking members 42, 43 concentric with said shaft and parallel when viewed from above (Fig. 5) with the shifting rods 10, 11, 12. The interval or gap 44 between the locking members is wide enough to release the upper end of one of the holding rods 34, 35, 36 (as shown for the rod 35 in Fig. 5). The width of each of the locking members 42 and 43 is sufficient to enable it, in certain positions, to engage the upper ends of two adjacent holding rods at the same time. When the arm 5 is coupled with one of the shifting rods 10, 11, or 12 by the engagement of the head 6 in the recess 7 of that particular rod, the gap 44 will be immediately above the holding rod 34, 35 or 36 corresponding to the shifting rod so coupled, so that this holding rod is released and free to yield upwardly when the controlling lever 1 is swung to slide the corresponding shifting rod. The other two holding rods are at that time locked either by individual engagement with the two locking members 42, 43 as in Fig. 5, or in the other positions one of the locking members will lock two holding rods.

The operation of the above-described mechanism is as follows: Let us assume that it is desired to shift the rod 11 by means of the controlling lever 1 in such a manner as to bring the gear 24 (Fig. 5) into mesh with the gear 26. First, the lever is brought into its central or neutral position, since this is the only one in which the slots 17 of the segmental guide 13 (Fig. 5) will allow the lever 1 to be moved laterally, that is to say, axially. Then the lever 1, together with the rock shaft 4 and the coupling arm 5, is moved axially in one direction or the other as required to bring the head 6 of the coupling arm 5 into the recess 7 of the shifting rod 11, thus operatively connecting the controlling lever with said rod. This axial movement of the lever 1 brings the gap 44 to a position immediately over the holding rod 35, while the locking members 42, 43 are brought immediately above the upper ends of the holding rods 34, 36. If then the lever 1 be swung in the direction indicated by the arrow in Fig. 1, the coupling arm 5 will move the shifting rod 11 toward the left, thus bringing the gear 24 in mesh with the gear 26. This movement of the rod 11 causes the holding ball or stop 32 to be raised out of the socket 29, causing the plunger 35 to move against the influence of the spring 39, the upper end of the said plunger or holding rod rising into the gap 44 between the two holding members 42, 43. As long as the arm 5 is in operative connection with the shifting rod 11, the other two rods 10 and 12 are held against lengthwise movement by the action of the locking members 42, 43 which lie immediately above the upper ends of the holding rods 34 and 36 respectively and thus prevent these rods, and the corresponding stop balls 28 and 30 respectively, from rising. As the lever 1 is swung on its axis, the locking members 42, 43 slide on the upper ends of the holding rods 34, 36. I thus absolutely prevent any accidental movement of the two shifting rods which at the time are not coupled or operatively connected with the controlling lever 1. If thereupon it be desired to actuate the shifting rod 10, it is necessary first to bring the rod 11 into its central or neutral position by swinging the controlling lever 1 in the proper direction. Then the lever 1 is moved axially in such a manner as to bring the coupling arm 5 into the recess 7 of the shifting rod 10. This movement of the lever 1 will bring the gap 44 immediately above the holding rod 34, while the locking member 43 comes to lie immediately above the holding rods 35, 36. (The locking member 42 performs no function in this particular position.) The shifting rod 10 may then be moved lengthwise by swinging the lever 1 on its fulcrum, since the stop ball 31 is free to leave its socket 28, lifting the holding rod 34; at the same time, the locking member 43 prevents any upward movement of the holding rods 35, 36, so that the stop balls 32, 33 are held in their sockets 29, 30, thus locking the shifting rods 11, 12 against lengthwise movement. In a similar way, upon coupling the arm 5 with the shifting rod 12 the corresponding holding rod (36) will be released for longitudinal movement, while the holding rods 34, 35 will be kept in their lower position by the locking member 42, thus preventing any longitudinal movement of the shifting rods 10, 11.

The constructions shown in Figs. 6 to 9 operate substantially in the same manner as the one illustrated by Figs. 1 to 5.

According to Figs. 6 and 7, the hub of the coupling arm 5 carries the curved locking members 45, 46, separated by a gap 47, and similar in construction to the locking members 42, 43 of the construction described above. The locking arcs or members 45, 46 do not engage the holding rods 34, 35, 36 directly, but serve to lock any two of three elbow levers 48, 49, 50 mounted to rock on a shaft 51 journaled in the frame 3. These levers 48, 49, 50 are connected pivotally with the upper ends of the holding rods 34, 35, and 36 respectively, which in this case are considerably longer than in the construction shown in Figs. 1 to 5. In a manner analogous to that first described, the gap 47 releases only the one lever 48, 49 or 50 which corresponds to the shifting rod 10, 11 or 12 respectively operatively connected with the coupling arm 5 at that particular time, while the other two elbow levers are locked by the locking members 45, 46 or by one of them.

In Figs. 8 and 9, the coupling arm 5 is provided with locking members 42, 43 substantially as in Figs. 1 to 5, that is to say, with an intervening gap 44. The locking members however do not engage the holding rods 34, 35, 36 directly but operate on them through the medium of levers 52, 53, 54 respectively fulcrumed upon a shaft 55 journaled in the guide 38, said levers being connected pivotally with the holding rods 34, 35 and 36 respectively.

The stop balls 31, 32, 33 may be omitted and the holding rods themselves caused to act as stops by bringing their lower ends into sockets or notches of the shifting rods 10, 11, 12. In this case, the lower ends of the holding rods would be sharpened (beveled) or rounded, and the sockets or notches of the shifting rods would be shaped correspondingly. This modification and others may be made without departing from the nature of my invention as set forth in the appended claim.

I claim:

A speed-changing gearing comprising shifting rods, stops for holding said rods against accidental movement, springs exerting on said stops a pressure which forces them toward the respective rods and into holding position, a controlling lever movable laterally to bring it into operative connection with one or the other of said shifting rods, and locking members connected with said lever rigidly and curved concentrically with the axis of said lever, the said members being arranged to lock the stops of those shifting rods which at the time are not operatively connected with the controlling lever, while releasing the stop of the shifting rod temporarily connected with said lever.

In testimony whereof I have signed this specification in the presence of two subscribing witnesses.

GUSTAV SCHLATTER.

Witnesses:
RANDALL ATKINSON,
EUGENE NABELK.